United States Patent
Sun et al.

(10) Patent No.: US 9,369,244 B2
(45) Date of Patent: Jun. 14, 2016

(54) METHOD FOR REDUCING INTER-FEMTOCELL INTERFERENCE AND FEMTOCELL BASE STATION

(71) Applicant: Huawei Technologies Co., Ltd., Shenzhen (CN)

(72) Inventors: Guolin Sun, Shenzhen (CN); Wei Jiang, Shenzhen (CN); Guodong Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 193 days.

(21) Appl. No.: 14/188,113

(22) Filed: Feb. 24, 2014

(65) Prior Publication Data

US 2014/0171095 A1    Jun. 19, 2014

Related U.S. Application Data

(63) Continuation of application No. PCT/CN2011/078763, filed on Aug. 23, 2011.

(51) Int. Cl.
| | |
|---|---|
| *H04W 72/00* | (2009.01) |
| *H04L 5/00* | (2006.01) |
| *H04W 72/08* | (2009.01) |
| *H04W 16/14* | (2009.01) |
| *H04L 27/00* | (2006.01) |
| *H04W 84/04* | (2009.01) |

(52) U.S. Cl.
CPC .......... *H04L 5/0032* (2013.01); *H04L 27/0006* (2013.01); *H04W 16/14* (2013.01); *H04W 72/082* (2013.01); *H04W 84/045* (2013.01)

(58) Field of Classification Search
CPC ..... H04W 24/00; H04W 24/08; H04W 72/04; H04W 72/082; H04W 16/10; H04W 28/04
USPC ......... 455/452.1, 67.121, 67.13, 226.1, 226.3
See application file for complete search history.

(56) References Cited

U.S. PATENT DOCUMENTS

| | | | |
|---|---|---|---|
| 8,170,081 B2 * | 5/2012 | Forenza ............... | H04B 7/0417 370/278 |
| 8,228,853 B2 * | 7/2012 | Ji ..................... | H04W 36/0083 370/318 |
| 8,385,832 B2 * | 2/2013 | Johansson ........... | H04W 52/243 370/310 |
| 8,391,796 B2 * | 3/2013 | Srinivasan ............ | H04W 16/08 370/329 |
| 8,489,028 B2 * | 7/2013 | Bhattad ............. | H04W 72/0406 455/63.1 |
| 8,670,432 B2 * | 3/2014 | Luo ........................ | H04B 7/024 370/345 |

* cited by examiner

*Primary Examiner* — Temica M Beamer
(74) *Attorney, Agent, or Firm* — Brinks Gilson & Lione

(57) ABSTRACT

The present invention discloses a method for reducing inter-Femtocell interference, including: obtaining an average channel gain of all available channels; determining whether the average channel gain is greater than a preset threshold; if the average channel gain is greater than the preset threshold, determining, by using spectrum sensing, a P channel and an N channel, where the P channel is one or more available channels causing greatest interference and the N channel is one or more available channels suffering greatest interference; and transmitting or receiving a signal in an available channel other than the P channel and the N channel.

10 Claims, 1 Drawing Sheet

METHOD FOR REDUCING INTER-FEMTOCELL INTERFERENCE AND FEMTOCELL BASE STATION

CROSS-REFERENCE TO RELATED APPLICATIONS

This application is a continuation of International Application No. PCT/CN2011/078763, filed on Aug. 23, 2011, which is hereby incorporated by reference in its entirety.

TECHNICAL FIELD

The present invention relates to the field of communication technologies, and in particular, to a method for reducing inter-Femtocell interference and a Femtocell base station.

BACKGROUND

A Femtocell (Femtocell) base station is a small base station that can be applied indoors and is able to provide high-speed indoor wireless access to users in a simple and cost-effective mode. Femtocell base stations may be installed independently by users. Because the Femtocell base stations are deployed at random, interference is caused to traditional macro base stations that are built according to a detailed frequency reuse plan, and interference also exists between the Femtocell base stations.

Currently, among researches on interference of Femtocell base stations, most focus on interference caused by the Femtocell base stations to macro base stations, and few relate to interference between the Femtocell base stations. In addition, Femtocell base stations do not have a unified backhaul (Backhaul) link, making it difficult to implement information sharing and coordination; and the Femtocell base stations usually contend to access the same frequency band in disorder, making it difficult to coordinate inter-Femtocell interference.

SUMMARY

Embodiments of the present invention provide a method for reducing inter-Femtocell interference and a Femtocell base station, which can reduce inter-Femtocell interference.

A method for reducing inter-Femtocell interference includes:

obtaining an average channel gain of all available channels;

determining whether the average channel gain is greater than a preset threshold;

if the average channel gain is greater than the preset threshold, determining a P channel and an N channel by using spectrum sensing, where the P channel is one or more available channels causing greatest interference and the N channel is one or more available channels suffering greatest interference; and transmitting or receiving a signal in an available channel other than the P channel and the N channel.

A Femtocell base station includes:

an obtaining module, configured to obtain an average channel gain of all available channels;

a determining module, configured to determine whether the average channel gain is greater than a preset threshold;

a spectrum sensing and channel determining module, configured to determine a P channel and an N channel by using spectrum sensing when the determining module determines that the average channel gain is greater than the preset threshold, where the P channel is one or more available channels causing greatest interference and the N channel is one or more available channels suffering greatest interference; and a transmitting and receiving module, configured to transmit or receive a signal in an available channel other than the P channel and the N channel when the determining module determines that the average channel gain is greater than the preset threshold.

In the method provided in embodiments of the present invention, when the average channel gain of all available channels is greater than a preset threshold, a Femtocell base station can determine, by using spectrum sensing, a P channel causing greatest interference and an N channel suffering greatest interference, and transmit or receive a signal only in an available channel other than the P channel and the N channel. In this way, not only interference caused to other Femtocell base station can be reduced, but also interference suffered by other Femtocell base stations can be reduced.

DESCRIPTION OF EMBODIMENTS

In the coverage of a macro cell base station or a television tower, there may be multiple Femtocell base stations, and each Femtocell base station can obtain a vacant channel of a macro cell network or a television spectrum as an available channel of the Femtocell base station, so that each Femtocell base station does not cause interference to a macro cell user or a television user. A Femtocell base station may obtain a vacant channel by using the following methods: one method is: the Femtocell base station obtains the vacant channel from a pre-configured database; another method is: a spectrum sensing module based on a cognitive radio (Cognitive Radio, CR) technology is installed on each Femtocell base station, and the vacant channel is obtained by using spectrum sensing. Generally, after a newly accessed Femtocell base station obtains available channels, the Femtocell base station allocates power to users in all the available channels when transmitting or receiving signals.

Considering that interference in different available channels varies, an embodiment of the present invention provides a method for reducing inter-Femtocell interference, including: when overall interference in all available channels is relatively great, not transmitting or receiving signals in all the available channels any more, but determining, among all the available channels, a P channel causing great interference and an N channel suffering great interference; and transmitting or receiving a signal only in an available channel other than the P channel and the N channel. In this way, not only the interference caused to other Femtocell base stations can be reduced, but also the interference suffered by other Femtocell base stations can be reduced. The P channel is one or more available channels causing greatest interference, and the N channel is one or more available channels suffering greatest interference. An embodiment of the present invention further provides a corresponding Femtocell base station. Details are hereinafter described.

Figure 1:
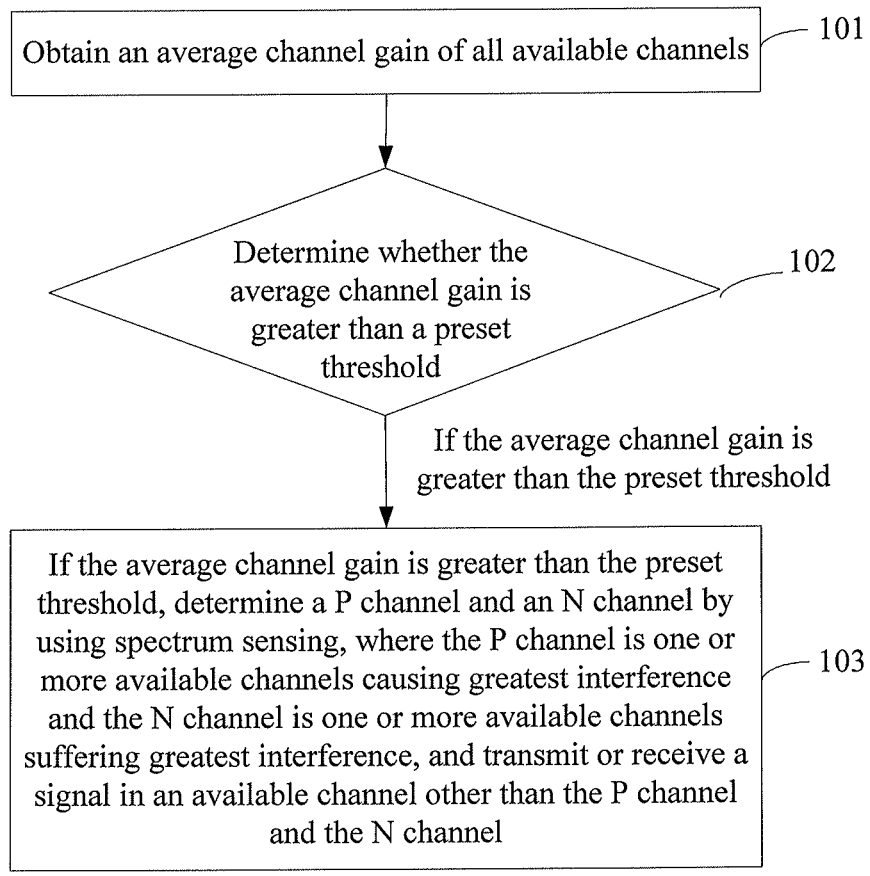
FIG. 1 is a flowchart of a method for reducing inter-Femtocell interference according to an embodiment of the present invention.

As shown in FIG. 1, a method for reducing inter-Femtocell interference according to an embodiment includes the following:

101. Obtain an average channel gain of all available channels.

It is assumed that the quantity of available channels is F, and that transmit power of an $i^{th}$ Femtocell base station among multiple Femtocell base stations in each channel is represented by the following power vector: $p_i=[p_i(1), p_i(2), \ldots, p_i(f), \ldots, p_i(F)]^T$, where $p_i(f)$ indicates transmit power of the $i^{th}$ Femtocell base station in an $f^{th}$ channel. If the $i^{th}$ Femtocell base station allocates power in all available channels, each element in the power vector $p_i$ is a non-zero value; if an element in the power vector is zero, it indicates that the channel is not occupied by the $i^{th}$ Femtocell base station.

For brief analysis, it is assumed that each Femtocell base station has only one active user, where a user of the $i^{th}$ Femtocell base station is briefly called an user and a user of a $j^{th}$ Femtocell base station is briefly called a $j^{th}$ user. $g_{ii}$ is used to indicate a channel gain from the $i^{th}$ Femtocell base station to the $i^{th}$ user, $g_{ij}$ is used to indicate a channel gain from the $i^{th}$ Femtocell base station to the $j^{th}$ user, and $g_{ji}$ is used to indicate a channel gain from the $j^{th}$ Femtocell base station to the $i^{th}$ user.

In this case, interference suffered by the $i^{th}$ user may be represented as follows: $\Sigma_{i=1, i \neq j}^{N} g_{ji}(f)p_i(f)$, where $g_{ji}(f)$ indicates the channel gain from the $j^{th}$ Femtocell base station to the $i^{th}$ user in an $i^{th}$ channel.

An equivalent channel gain of the $i^{th}$ Femtocell base station in the $f^{th}$ channel may be represented as follows:

$$\tilde{g}_{ii} = \frac{g_{ii}(f)}{z_n + \sum_{i=1, i \neq j}^{N} g_{ji}(f)p_i(f)},$$

where, $g_{ii}(f)$ indicates the channel gain from the $i^{th}$ Femtocell base station to the $i^{th}$ user in the in the $f^{th}$ channel, and $z_n$ indicates noise power.

In the formula of the equivalent channel gain $\tilde{g}_{ii}$, $g_{ii}(f)$ may be obtained through channel estimation, $\Sigma_{i=1, i \neq j}^{N} g_{ji}(f)p_i(f)$ may be obtained by using spectrum sensing, and the noise power $z_n$ may be obtained by using a method in the prior art. When interference exists, the noise power is relatively small and may be ignored.

After obtaining the equivalent channel gain $\tilde{g}_{ii}$ in all the F channels, the $i^{th}$ Femtocell base station can calculate an average channel gain of all the F channels by using the following formula:

$$\bar{g}_{ii} = \frac{1}{F} \sum_{f=1}^{F} \tilde{g}_{ii}.$$

The average channel gain $\bar{g}_{ii}$ indicates interference power suffered by the $i^{th}$ Femtocell base station in all the available channels.

102. Determine whether the average channel gain is greater than a preset threshold.

A preset threshold $\mu$ may be preset according to a system performance requirement, or may be preset according to experience. Whether the average channel gain $\bar{g}_{ii}$ is greater than the preset threshold $\mu$ is determined. For example:

If $\bar{g}_{ii} \geq \mu$, it indicates that the interference suffered by the $i^{th}$ Femtocell base station is relatively small and that corresponding data throughput may be relatively great. In this case, even if the Femtocell base station occupies a few channels, normal data transmission can be guaranteed.

If $\bar{g}_{ii} < \mu$, it indicates that the interference suffered by the $i^{th}$ Femtocell base station is relatively great and that corresponding data throughput is relatively small. In this case, the Femtocell base station should occupy as many channels as possible to ensure the normal data transmission.

Subsequently, there are some differences in allocating frequencies according to the foregoing different determination results.

103. If the average channel gain $\bar{g}_{ii}$ is greater than the preset threshold $\mu$, determine the P channel and an N channel by using spectrum sensing, where the P channel is one or more available channels causing greatest interference and the N channel is one or more available channels suffering greatest interference, and transmit or receive a signal in an available channel other than the P channel and the N channel.

If $\bar{g}_{ii} \geq \mu$, it indicates that interference suffered by the Femtocell base station is relatively small. In this case, during power allocation, some channels may be excluded: In one aspect, power is mainly allocated to channels having good channel conditions and suffering relatively small interference; in another aspect, a channel causing relatively great interference are excluded to reduce interference caused to another channel.

Then, when $\bar{g}_{ii} \geq \mu$, interference power in each available channel may be obtained by using spectrum sensing, and a channel causing relatively great interference, that is, one or more channels through which the Femtocell base station causes greatest interference to other Femtocell base stations, may be determined to be the P channel; and a channel receiving relatively great interference, that is, one or more channels through which the Femtocell base station suffers greatest interference from other Femtocell base stations, may be determined to be the N channel; and a signal is transmitted or received in an available channel other than the P channel and the N channel. The specific quantity of P channels or N channels may be determined according to the requirement of an application scenario, for example, in a case that the total quantity of available channels is great, a large number of P channels and N channels may be determined.

Specifically, the Femtocell base station may transmit a sounding (Sounding) signal in each available channel to obtain interference power in each channel by using spectrum sensing, and determine the P channel and N channel according to the variation between the interference power before transmitting the sounding signal and the interference power after transmitting the sounding signal. After determining the P channel and the N channel, the Femtocell base station may exclude the P channel and the N channel, and transmit or receive a signal only in another available channel.

In other embodiments, if the average channel gain $\bar{g}_{ii}$ is smaller than the preset threshold $\mu$, the Femtocell base station may transmit or receive signals in all channels. Because $\bar{g}_{ii} \geq \mu$, interference suffered by the Femtocell base station is relatively great. In this case, the data throughput of the Femtocell base station is small, and the Femtocell base station should not exclude any channel. Therefore, the Femtocell base station can transmit or receive signals in all available channels.

According to the foregoing method disclosed in the embodiment of the present invention, when the average channel gain of all available channels is greater than a preset threshold, a Femtocell base station determines, by using spectrum sensing, the P channel causing greatest interference and an N channel suffering greatest interference, and transmits or receives a signal only in an available channel other than the P channel and the N channel. In this way, not only interference caused to other Femtocell base station can be reduced, but also interference suffered from other Femtocell base stations can be reduced.

The following describes how to allocate power in the process of transmitting or receiving signals. In the process of transmitting or receiving signals, a conventional water injection principle may be used for power allocation. A target function for defining power allocation is shown in the following, and power can be allocated to each channel by solving the following formula:

$$J_i = \max_{p_i}\{T_i\} = \max_{p_i}\left\{\sum_{f=1}^{F}\log_2\left(1+\frac{g_{ii}(f)p_i(f)}{z_n+\sum_{i=1,i\neq j}^{N}g_{ji}(f)p_i(f)}\right)\right\}$$

where, $$T_i = \sum_{f=1}^{F}\log_2\left(1+\frac{g_{ii}(f)p_i(f)}{z_n+\sum_{i=1,i\neq j}^{N}g_{ji}(f)p_i(f)}\right)$$

indicates the channel capacity of the $i^{th}$ Femtocell base station (that is, greatest theoretical throughput), $$J_i = \max_{p_i}\{T_i\}$$

indicates greatest channel capacity of each Femtocell base station obtained by allocating power to each channel, $$\sum_{f=1}^{F}p_i(f)\leq P$$

is a constraint condition, and P indicates total greatest transmit power in all channels of the Femtocell base station.

The following describes in detail how to determine the P channel and an N channel by using spectrum sensing.

For brief analysis, a system having only two Femtocell base stations is taken as example for description. An original Femtocell base station in the system is called a first Femtocell base station, and a newly accessed Femtocell base station is called a second Femtocell base station.

The Femtocell base station can obtain, by using spectrum sensing, interference power received from other Femtocell base stations in each available channel. Before the second Femtocell base station accesses the system, only the first Femtocell base station exists in the system. In this case, the equivalent channel gain of an $f^{th}$ channel may be represented as follows:

$$\tilde{g}_{11}(f) = \frac{g_{11}(f)}{z_n},$$

where f indicates a channel, and $z_n$ indicates noise power.

According to the water injection principle, transmit power of the first Femtocell base station in each available channel may be obtained as follows:

$$p^{(0)}(f) = \left[\gamma - \frac{1}{\tilde{g}_{11}(f)}\right]^+,$$

where, f indicates the channel, and γ indicates the power allocated by water injection.

Then, when the second Femtocell base station accesses the system, interference power received by users of the second Femtocell base station in each channel may be represented by the following vector:

$$I^{(0)} = [g_{12}(1)p^{(0)}(1), g_{12}(2)p^{(0)}(2), \ldots, g_{12}(F)p^{(0)}(F)]^T,$$

where, $g_{12}$ indicates the channel gain from the first Femtocell base station to the second Femtocell base station, and the superscript (0) of I indicates an initial state, that is, no sounding signal is transmitted.

The interference power $I^{(0)}$ may be obtained by a spectrum sensing module of the Femtocell base station.

The second Femtocell base station can transmit a sounding signal in each available channel in sequence, and occupy only one channel each time; each time when transmitting a sounding signal, the second Femtocell base station obtains, by using spectrum sensing, the interference power $I^{(k)}$ received from other Femtocell base stations in each available channel, calculates a variation value between $I^{(k)}$ and $I^{(0)}$, and determines the P channel and the N channel according to the variation value.

If the newly accessed second Femtocell base station transmits a sounding signal with transmit power P in a $k^{th}$ channel, the equivalent channel gain of the original first Femtocell base station is as follows:

$$\tilde{g}_{11}(f) = \frac{g_{11}(f)}{z_n+g_{21}(f)},$$

where $g_{21}$ indicates the channel gain from the newly accessed second Femtocell base station to the original first Femtocell base station.

The original first Femtocell base station adjusts transmit power of each channel according to the interference variation, specifically the variation of the equivalent channel gain. If $p^{(k)}(f)$ is used to indicate the transmit power of the $i^{th}$ channel when a sounding signal is transmitted in the $k^{th}$ channel, then:

$$\begin{cases}p^{(k)}(f)\geq p^{(0)}(f), & f\neq k\\p^{(k)}(f)\leq p^{(0)}(f), & f=k\end{cases}$$

The above formula indicates how the first Femtocell base station adjusts transmit power in each channel: After the second Femtocell base station transmits a sounding signal in the $k^{th}$ channel, the original first Femtocell base station senses that the interference in the $k^{th}$ channel increases, and then reduces the transmit power in the $k^{th}$ channel according to the water injection principle. Therefore, when f=k, the power is reduced. Because the total power remains unchanged, when f=k, the channel in which the sounding signal is transmitted is reduced, and power in other channels is increased accordingly.

When a sounding signal with transmit power P is transmitted in the $k^{th}$ channel, interference power received by users of the newly accessed second Femtocell base station in each channel may be represented by the following vector:

$$I^{(k)}=[g_{12}(1)p^{(k)}(1), g_{12}(2)p^{(k)}(2), \ldots, g_{12}(F)p^{(k)}(F)]^T$$

After a sounding signal is transmitted in all F available channels in sequence, F interference power vectors may be obtained and marked as $I^{(1)}, I^{(2)}, \ldots, I^{(k)}, \ldots, I^{(F)}$.

Variation values $\Delta I^{(k)} = |I^{(k)} - I^{(0)}|$ between the F values of interference power $I^{(k)}$ obtained by transmitting a sounding signal for F times and the interference power $I^{(0)}$ received by the second Femtocell base station when the second Femtocell base station accesses the system initially are calculated, and a matrix $\Delta I = [\Delta I^{(1)}, \Delta I^{(2)}, \ldots, \Delta I^{(k)}, \ldots, \Delta I^{(F)}]_{F \times F}$ may be obtained. If the matrix is expanded, then:

$$\Delta I = \begin{pmatrix} g(1)[p^{(1)}(1) - p^{(0)}(1)] & g(1)[p^{(2)}(1) - p^{(0)}(1)] & \ldots & g(1)[p^{(F)}(1) - p^{(0)}(1)] \\ g(2)[p^{(1)}(2) - p^{(0)}(2)] & g(2)[p^{(2)}(2) - p^{(0)}(2)] & \ldots & g(2)[p^{(F)}(2) - p^{(0)}(2)] \\ \vdots & \vdots & \ddots & \vdots \\ g(F)[p^{(1)}(F) - p^{(0)}(F)] & g(F)[p^{(2)}(F) - p^{(0)}(F)] & \ldots & g(F)[p^{(F)}(F) - p^{(0)}(F)] \end{pmatrix}$$

In the above matrix, $g(f) = g_{12}(f)$.

In the above matrix, an element is $\Delta I^{(k)} = |I^{(k)} - I^{(0)}| = g(f)[p^{(k)}(f) - p^{(0)}(f)]$, where the value of the element depends on the channel gain $g(f)$ and the power adjustment amount $[p^{(k)}(f) - p^{(0)}(f)]$. The channel gain $g(f) = g_{12}(f)$, it indicates interference caused by the original first Femtocell base station to the newly accessed second Femtocell base station; the adjustment amount of the transmit power $[p^{(k)}(f) - p^{(0)}(f)]$ can indirectly indicate the interference caused by the newly accessed second Femtocell base station to the original first Femtocell base station (according to the water injection principle, the greater the interference is, the greater the adjustment amount is).

In the matrix, elements in the diagonal line from the upper left corner to the lower right corner are main diagonal elements. Using the first element $g(1)[p^{(1)}(1) - p^{(0)}(1)]$ in the upper left corner as an example, because the second Femtocell base station transmits a sounding signal in a first channel, the first Femtocell base station reduces the transmit power $p^{(1)}(1)$ in the first channel, so that the $[p^{(1)}(1) - p^{(0)}(1)]$ is a negative number and the corresponding element $g(1)[p^{(1)}(1) - p^{(0)}(1)]$ is also a negative number. Similarly, all main diagonal elements are negative numbers.

The $k^{th}$ column of the above matrix indicates variation values of interference suffered by users of the newly accessed second Femtocell base station in each channel after a sound signal is transmitted in the $k^{th}$ channel. In the $k^{th}$ column of the matrix, the $k^{th}$ element (a main diagonal element) corresponding to the $k^{th}$ channel is a negative number. However, if the first Femtocell base station increases transmit power in other channels, other elements are positive numbers, and because noise interference in other channels is basically the same, the adjustment amount of transmit power is basically the same. Then, the values of each element in the same column may reflect the values of the channel gain $g(f) = g_{12}(f)$, that is, they may reflect interference suffered by users of the newly accessed second Femtocell base station in each channel. The greater the value of an element in the same column is, the greater the interference suffered by the second Femtocell base station in a corresponding channel is. Therefore, a channel corresponding to the greatest element may be used as the N channel. Some examples are taken in the following for description:

No matter in which channel a sounding signal is transmitted, the first Femtocell base station always allocates power according to the water injection principle. At the beginning, there is no interference in each channel of the first Femtocell base station and the noise power is the same. Therefore, power allocated to each channel is basically equal. Assuming that the second Femtocell base station begins to transmit a sounding signal in the first channel while the transmit power in other channels is zero, for the first Femtocell base station, interference in channels other than the first channel is still noise only. Therefore, power allocated to channels other than the first channel is basically the same, and the power adjustment amount $[p^{(1)}(f) - p^{(0)}(f)]$, $f = 2, \ldots, F$ is basically the same. In the case, the $g(f)$ corresponding to the greatest element is also the greatest, and therefore a channel corresponding to the greatest element can be determined to be an N channel. If a sounding signal is transmitted in the second channel (corresponding to a second column), power adjustment amount in elements other than the second element corresponding to the second channel in the second column is basically the same. The values of the elements can still reflect the values of the $g(f)$, and therefore the same N channel can still be determined. Therefore, when the N channel is determined, any one column may be selected, and a channel corresponding to the greatest element in the column is selected as the N channel, without considering other columns. To improve accuracy, more rows may be observed at the same time to compare results. A channel suffering greatest interference may be selected as the N channel, or one or more channels suffering greatest interference may be selected as the N channel.

Each row in the above matrix indicates a channel, and each element $\Delta I^{(k)} = g(f)[p^{(k)}(f) - p^{(0)}(f)]$ in the $f^{th}$ row indicates interference suffered by the $f^{th}$ channel each time when a sounding signal is transmitted. In the $f^{th}$ row of the matrix, the $f^{th}$ element (a main diagonal element) is a negative number, but elements corresponding to other channels are positive numbers. Because the $g(f)$ in each element of the same row is the same, the values of each element may reflect the adjustment amount of transmit power $[p^{(k)}(f) - p^{(0)}(f)]$, that is, they may reflect interference caused by the second Femtocell base station to the first Femtocell base station. The greater the value of an element in the same row is, the greater the interference in a corresponding channel that the second Femtocell base station causes to the original first Femtocell base station is. Therefore, a channel corresponding to the greatest element may be used as the P channel. Some examples are taken in the following for description:

Assuming that a channel that causes relatively great interference is a third channel, when the second Femtocell base station transmits a sounding signal in the third channel, great interference is caused to the first Femtocell base station. The first Femtocell base station reduces the transmit power in the third channel. According to the water injection principle, the greater the interference is, the more the power is reduced. Because the total power remains unchanged, power in other channels increases to the greatest extent, and power adjustment amount is greater, as compared with the power before the sounding signal is transmitted. In addition, interference in other channels is noise of the same power, and power allocated to each channel is basically the same. Therefore, it can be determined, according to any row, that the third channel causes greatest interference. If observation is performed at the first channel (corresponding to the first row of the matrix), when there is a sounding signal in the third channel, the power adjustment amount is the greatest, that is, the $[p^{(3)}(1)-p^{(0)}(1)]$ is the greatest; if observation is performed at the second channel (corresponding to the second row), when there is a sounding signal in the third channel, the adjustment amount of transmit power is the greatest, that is, $[p^{(3)}(2)-p^{(0)}(2)]$ is the greatest. Therefore, when the P channel is determined, any one row may be selected, and a channel corresponding to the greatest element in the row is selected as the P channel, without considering other rows. To improve accuracy, more rows may be observed at the same time to compare results. A channel causing greatest interference may be selected as the P channel, or one or more channels causing greatest interference may be selected as the P channel.

In conclusion, when the second Femtocell base station transmits a sounding signal in a channel, the power in other channels is zero. Therefore, other channels cause the same interference (which may be noise power or may be ignored) to the first Femtocell base station, and power allocated to the other channels according to the water injection principle and power variations before and after a sounding signal is transmitted are always the same in the other channels. Therefore, the P channel and the N channel may be determined by observing any row and any column in the matrix.

Therefore, one or more channels corresponding to a greatest interference power variation value after a sounding signal is transmitted may be used as the N channel; and after a sounding signal is transmitted in each channel, any channel is selected, and a channel in which a sounding signal is transmitted and which corresponds to one or more greatest interference power variation values may be used as the P channel.

For example, if the obtained matrix is:

$$\Delta I = \begin{pmatrix} -1 & 7 & 3 & 4 \\ 4 & -9 & 6 & 6 \\ 6 & 8 & -5 & 3 \\ 7 & 10 & 8 & -6 \end{pmatrix}$$

where, the value of the fourth element is the greatest in each column (because the fourth element in the fourth column is a negative number, the fourth column may not be considered), so that the fourth channel may be determined to be the N channel; the value of the second element is the greatest in each row (because the second element in the second row is a negative number, the second row may not be considered), the second channel may be determined to be the P channel. A simple method may be as follows: A channel corresponding to the row where the greatest element 10 is located in the matrix may be used as the N channel, and a channel corresponding to the column where the greatest element 10 is located in the matrix may be used as the P channel.

According to the above analysis, the following methods may be used to determine the P channel or the N channel:

1. Determine the N Channel:

First interference power suffered by other Femtocell base stations in each available channel is obtained by using spectrum sensing; a sounding signal is transmitted in one available channel, and when a sounding signal is transmitted, second interference power suffered by other Femtocell base stations in each available channel is obtained by using spectrum sensing; variation values between the second interference power and the first interference power in each available channel are calculated; and one or more channels corresponding to a greatest interference power variation value is determined to be the N channel.

Determining one or more channels corresponding to a greatest interference power variation value may be as follows: A first threshold is set, and one or more channels corresponding to an interference power variation value greater than the first threshold is determined to be the N channel.

2. Determine the P Channel:

Third interference power received from other Femtocell base stations in a specified available channel is obtained by using spectrum sensing; a sounding signal is transmitted in all available channels in sequence, and each time when a sounding signal is transmitted, fourth interference power received from other Femtocell base stations in the specified available channel is obtained by using spectrum sensing; interference power variation values between the obtained multiple values of fourth interference power and the third interference power are calculated; and a channel in which a sounding signal is transmitted and which corresponds to one or more greatest interference power variation values is determined to be the P channel.

Determining a channel in which a sounding signal is transmitted and which corresponds to one or more greatest interference power variation values may also be as follows: A second threshold is set, and a channel in which a sounding signal is transmitted and which corresponds to one or more interference power variation values greater than the second threshold is determined to be the P channel.

3. Determine the P Channel or the N Channel at the Same Time:

Fifth interference power suffered by other Femtocell base stations in each available channel is obtained by using spectrum sensing; a sounding signal is transmitted in all available channels in sequence, and each time when a sounding signal is transmitted, sixth interference power suffered by other Femtocell base stations in each available channel is obtained by using spectrum sensing; an interference power variation value between the fifth interference power and the sixth interference power in each available channel is calculated; one or more greatest interference power variation values are selected, a channel corresponding to the one or more greatest interference power variation values is determined to be the N channel, and a channel in which a sounding signal is transmitted and which corresponds to the one or more greatest interference power variation values is determined to be the P channel.

Figure 2:
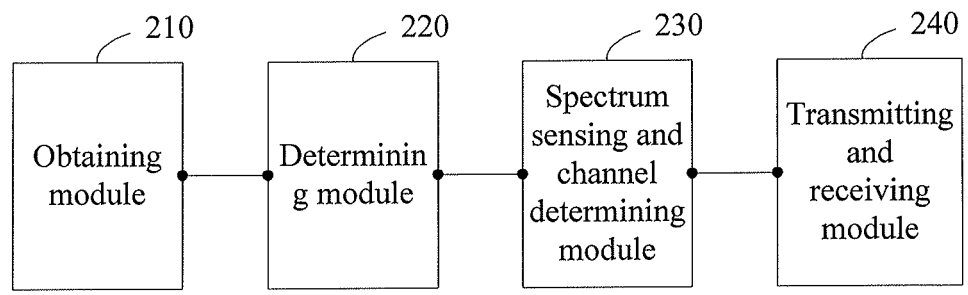
FIG. 2 is a logical structural diagram of a Femtocell base station according to an embodiment of the present invention.

As shown in FIG. 2, a Femtocell base station provided in an embodiment of the present invention includes:

an obtaining module 210, configured to obtain an average channel gain of all available channels;

a determining module 220, configured to determine whether the average channel gain is greater than a preset threshold;

a spectrum sensing and channel determining module 230, configured to determine a P channel and an N channel by using spectrum sensing when the determining module 220 determines that the average channel gain is greater than the preset threshold, where the P channel is one or more available channels causing greatest interference and the N channel is one or more available channels suffering greatest interference; and a transmitting and receiving module 240, configured to transmit or receive a signal in an available channel other than the P channel and the N channel when the determining module 220 determines that the average channel gain is greater than the preset threshold.

The transmitting and receiving module 240 may be further configured to transmit or receive signals in all available channels when the determining module 220 determines that the average channel gain is not greater than the preset threshold.

In one implementation manner, the spectrum sensing and channel determining module 230 may be specifically configured to: obtain, by using spectrum sensing, first interference power suffered by other Femtocell base stations in each available channel; transmit a sounding signal in one available channel, and each time when transmitting a sounding signal, obtain, by using spectrum sensing, second interference power suffered by other Femtocell base stations in each available channel; calculate an interference power variation value between the second interference power and the first interference power in each available channel; and determine one or more channels corresponding to a greatest interference power variation value to be the N channel.

In one implementation manner, the spectrum sensing and channel determining module 240 may be specifically configured to: obtain, by using spectrum sensing, third interference power received from other Femtocell base stations in a specified available channel; transmit a sounding signal in all available channels in sequence, and each time when transmitting a sounding signal, obtain, by using spectrum sensing, fourth interference power received from other Femtocell base stations in the specified available channel; calculate interference power variation values between the obtained multiple values of fourth interference power and the third interference power; and determine a channel in which a sounding signal is transmitted and which corresponds to one or more greatest interference power variation values to be the P channel.

In one implementation manner, the spectrum sensing and channel determining module 240 may be specifically configured to: obtain, by using spectrum sensing, fifth interference power suffered by other Femtocell base stations in each available channel; transmit a sounding signal in all available channels in sequence, and each time when transmitting a sounding signal, obtain, by using spectrum sensing, sixth interference power suffered by other Femtocell base stations in each available channel; calculate an interference power variation value between the fifth interference power and the sixth interference power in each available channel; select one or more greatest interference power variation values, determine a channel corresponding to the one or more greatest interference power variation values to be the N channel, and determine a channel in which a sounding signal is transmitted and which corresponds to the one or more greatest interference power variation values to be the P channel.

The spectrum sensing and channel determining module 240 may specifically include: a spectrum sensing unit configured to obtain interference power, a transmitting unit configured to transmit a sounding signal, and a processing unit configured to calculate an interference power variation value and determine the P channel and the N channel according to the interference power variation value.

With the Femtocell base station provided in the embodiment of the present invention, when the average channel gain of all available channels is greater than a preset threshold, the P channel causing greatest interference and the N channel suffering greatest interference can be determined by using spectrum sensing; and a signal is transmitted or received only in an available channel other than the P channel and the N channel. In this way, not only interference caused to other Femtocell base stations can be reduced, but also interference suffered from other Femtocell base stations can be reduced.

Persons of ordinary skill in the art should understand that all or a part of the steps of the methods in the embodiments may be implemented by a hardware or a program instructing relevant hardware. The program may be stored in a computer readable storage medium, such as a read only memory, a random access memory, a magnetic disk or an optical disk.

Detailed above are a method for reducing inter-Femtocell interference and a corresponding Femtocell base station provided in embodiments of the present invention. Specific embodiments are used to describe the principle and implementation of the present invention. The description of the embodiments is only used to help understand the method and the core idea of the present invention and shall not be construed as a limitation on the present invention.

What is claimed is:

1. A method for reducing inter-Femtocell interference, comprising:
   obtaining an average channel gain of all available channels;
   determining whether the average channel gain is greater than a preset threshold;
   if the average channel gain is greater than the preset threshold, determining a P channel and an N channel by using spectrum sensing, wherein the P channel is one or more available channels causing greatest interference and the N channel is one or more available channels suffering greatest interference,
   wherein the determining the N channel by using spectrum sensing comprises:
      obtaining, by using spectrum sensing, first interference power received from other Femtocell base stations in each available channel;
      transmitting a sounding signal in one available channel, and when transmitting the sounding signal, obtaining, by using spectrum sensing, second interference power received from other Femtocell base stations in each available channel;
      calculating an interference power variation value between the second interference power and the first interference power in each available channel; and
      determining one or more channels corresponding to a greatest interference power variation value to be the N channel; and
   transmitting or receiving a signal in an available channel other than the P channel and the N channel.

2. The method according to claim 1, wherein after the determining whether the average channel gain is greater than a preset threshold, the method further comprises:
   if the average channel gain is not greater than the preset threshold, transmitting or receiving signals in all available channels.

3. The method according to claim 1, wherein the determining one or more channels corresponding to a greatest interference power variation value to be the N channel comprises:
   determining one or more channels corresponding to an interference power variation value greater than a first threshold to be the N channel.

4. A method for reducing inter-Femtocell interference, comprising:
   obtaining an average channel gain of all available channels;
   determining whether the average channel gain is greater than a preset threshold;
   if the average channel gain is greater than the preset threshold, determining a P channel and an N channel by using spectrum sensing, wherein the P channel is one or more available channels causing greatest interference and the N channel is one or more available channels suffering greatest interference; and
   transmitting or receiving a signal in an available channel other than the P channel and the N channel, wherein the determining the P channel by using spectrum sensing comprises:
obtaining, by using spectrum sensing, third interference power received from other Femtocell base stations in a specified available channel;
transmitting a sounding signal in all available channels in sequence, and each time when transmitting a sounding signal, obtaining, by using spectrum sensing, fourth interference power received from other Femtocell base stations in the specified available channel;
calculating interference power variation values between obtained multiple values of fourth interference power and the third interference power; and
determining a channel in which a sounding signal is transmitted and which corresponds to one or more greatest interference power variation values to be the P channel.

5. The method according to claim 4, wherein the determining a channel in which a sounding signal is transmitted and which corresponds to one or more greatest interference power variation values to be the P channel comprises:
determining a channel in which a sounding signal is transmitted and which corresponds to one or more interference power variation values greater than a second threshold to be the P channel.

6. A method for reducing inter-Femtocell interference, comprising:
obtaining an average channel gain of all available channels;
determining whether the average channel gain is greater than a preset threshold;
if the average channel gain is greater than the preset threshold, determining a P channel and an N channel by using spectrum sensing, wherein the P channel is one or more available channels causing greatest interference and the N channel is one or more available channels suffering greatest interference; and
transmitting or receiving a signal in an available channel other than the P channel and the N channel,
wherein the determining the P channel and the N channel by using spectrum sensing comprises:
obtaining, by using spectrum sensing, fifth interference power received from other Femtocell base stations in each available channel;
transmitting a sounding signal in each available channel in sequence, and each time when transmitting a sounding signal, obtaining, by using spectrum sensing, sixth interference power received from other Femtocell base stations in each available channel;
calculating an interference power variation value between the fifth interference power and the sixth interference power in each available channel; and
selecting one or more greatest interference power variation values, determining a channel corresponding to the one or more greatest interference power variation values to be the N channel, and determining a channel in which a sounding signal is transmitted and which corresponds to the one or more greatest interference power variation values to be the P channel.

7. A Femtocell base station, comprising:
an obtaining module, configured to obtain an average channel gain of all available channels;
a determining module, configured to determine whether the average channel gain is greater than a preset threshold;
a spectrum sensing and channel determining module, configured to determine a P channel and an N channel by using spectrum sensing when the determining module determines that the average channel gain is greater than the preset threshold, wherein the P channel is one or more available channels causing greatest interference and the N channel is one or more available channels suffering greatest interference, wherein: the spectrum sensing and channel determining module is configured to:
obtain, by using spectrum sensing, first interference power received from other Femtocell base stations in each available channel; transmit a sounding signal in one available channel, and when transmitting the sounding signal, obtain, by using spectrum sensing, second interference power received from other Femtocell base stations in each available channel; calculate an interference power variation value between the second interference power and the first interference power in each available channel; and determine one or more channels corresponding to a greatest interference power variation value to be the N channel; and
a transmitting and receiving module, configured to transmit or receive a signal in an available channel other than the P channel and the N channel when the determining module determines that the average channel gain is greater than the preset threshold.

8. The Femtocell base station according to claim 7, wherein:
the transmitting and receiving module is further configured to transmit and receive signals in all available channels when the determining module determines that the average channel gain is not greater than the preset threshold.

9. A Femtocell base station, comprising:
an obtaining module, configured to obtain an average channel gain of all available channels;
a determining module, configured to determine whether the average channel gain is greater than a preset threshold;
a spectrum sensing and channel determining module, configured to determine a P channel and an N channel by using spectrum sensing when the determining module determines that the average channel gain is greater than the preset threshold, wherein the P channel is one or more available channels causing greatest interference and the N channel is one or more available channels suffering greatest interference; and
a transmitting and receiving module, configured to transmit or receive a signal in an available channel other than the P channel and the N channel when the determining module determines that the average channel gain is greater than the preset threshold, wherein:
the spectrum sensing and channel determining module is configured to: obtain, by using spectrum sensing, third interference power received from other Femtocell base stations in a specified available channel; transmit a sounding signal in all available channels in sequence, and each time when transmitting a sounding signal, obtain, by using spectrum sensing, fourth interference power received from other Femtocell base stations in the specified available channel; calculate interference power variation values between obtained multiple values of fourth interference power and the third interference power; and determine a channel in which a sounding signal is transmitted and which corresponds to one or more greatest interference power variation values to be the P channel.

10. A Femtocell base station, comprising:
an obtaining module, configured to obtain an average channel gain of all available channels;

a determining module, configured to determine whether the average channel gain is greater than a preset threshold;

a spectrum sensing and channel determining module, configured to determine a P channel and an N channel by using spectrum sensing when the determining module determines that the average channel gain is greater than the preset threshold, wherein the P channel is one or more available channels causing greatest interference and the N channel is one or more available channels suffering greatest interference; and a transmitting and receiving module, configured to transmit or receive a signal in an available channel other than the P channel and the N channel when the determining module determines that the average channel gain is greater than the preset threshold, wherein:

the spectrum sensing and channel determining module is configured to: obtain, by using spectrum sensing, fifth interference power received from other Femtocell base stations in each available channel; transmit a sounding signal in all available channels in sequence, and each time when transmitting a sounding signal, obtain, by using spectrum sensing, sixth interference power received from other Femtocell base stations in each available channel; calculate an interference power variation value between the fifth interference power and the sixth interference power in each available channel; select one or more greatest interference power variation values, determine a channel corresponding to the one or more greatest interference power variation values to be the N channel, and determine a channel in which a sounding signal is transmitted and which corresponds to the one or more greatest interference power variation values to be the P channel.

* * * * *